United States Patent
Ghai et al.

(10) Patent No.: US 8,706,113 B2
(45) Date of Patent: Apr. 22, 2014

(54) INTERWORKING FUNCTION FOR COMMUNICATION NETWORKS

(75) Inventors: Rajat Ghai, Sandwich, MA (US); Kuntal Chowdhury, Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 429 days.

(21) Appl. No.: 12/760,009

(22) Filed: Apr. 14, 2010

(65) Prior Publication Data

US 2010/0285797 A1 Nov. 11, 2010

Related U.S. Application Data

(60) Provisional application No. 61/169,153, filed on Apr. 14, 2009.

(51) Int. Cl.
*H04W 4/00* (2009.01)

(52) U.S. Cl.
USPC ........ 455/435.2; 370/331; 370/332; 370/333; 370/334; 455/436; 455/437; 455/438; 455/439; 455/440; 455/441; 455/442; 455/443; 455/444

(58) Field of Classification Search
USPC ............................ 370/331–334; 455/436–444
See application file for complete search history.

(56) References Cited

U.S. PATENT DOCUMENTS

| | | | |
|---|---|---|---|
| 2002/0160785 A1* | 10/2002 | Ovesjo et al. | 455/453 |
| 2003/0050076 A1 | 3/2003 | Watanabe | |
| 2004/0137918 A1 | 7/2004 | Varonen et al. | |
| 2005/0124341 A1 | 6/2005 | Myllymaki et al. | |
| 2006/0264213 A1 | 11/2006 | Thompson | |
| 2007/0207806 A1* | 9/2007 | Shaheen | 455/436 |
| 2007/0213059 A1* | 9/2007 | Shaheen | 455/436 |
| 2007/0254673 A1 | 11/2007 | Stenberg et al. | |
| 2008/0008127 A1* | 1/2008 | Choi et al. | 370/331 |
| 2008/0014957 A1* | 1/2008 | Ore | 455/452.1 |
| 2008/0082681 A1 | 4/2008 | Leseberg et al. | |
| 2008/0176582 A1 | 7/2008 | Ghai et al. | |
| 2008/0233947 A1 | 9/2008 | Herrero-Veron | |

(Continued)

OTHER PUBLICATIONS

3GPP TS 23.401 V8.3.0 (Sep. 2008), 3rd Generation Partnership Project; Technical Specification Group Services and System Aspects; General Packet Radio Services (GPRS) enhancements for Evolved Universal Terrestrial Radio Access Network (E-UTRAN) access (Release 8), http://www.3gpp.org. 204 pages.

(Continued)

*Primary Examiner* — Liton Miah
(74) *Attorney, Agent, or Firm* — Wilmer Cutler Pickering Hale and Dorr LLP

(57) ABSTRACT

Systems and methods for providing voice communications and data communications are provided, including: receiving an attach message from a mobile node indicating the mobile node can fallback from a first radio access technology to a second radio access technology and including location information identifying a location of the mobile node, the attach message received via the first radio access technology; sending a translated location updated message to a remote switching device; receiving a service request message from the mobile node, the service request message requesting initiation of a voice call, the service request message received via the first radio access technology; and based on the service request message and the indication that the mobile node can fallback to the second radio access technology, setting up the voice call with the mobile node via the second radio access technology.

17 Claims, 6 Drawing Sheets

(56) References Cited

U.S. PATENT DOCUMENTS

| | | | |
|---|---|---|---|
| 2008/0254768 | A1 | 10/2008 | Faccin |
| 2008/0291874 | A1* | 11/2008 | Bae et al. ............... 370/331 |
| 2008/0316972 | A1* | 12/2008 | Shaheen ............... 370/331 |
| 2009/0036131 | A1* | 2/2009 | Diachina et al. ............. 455/436 |
| 2009/0111468 | A1* | 4/2009 | Burgess et al. ............. 455/436 |
| 2010/0041418 | A1* | 2/2010 | Edge et al. ............. 455/456.2 |
| 2010/0054207 | A1* | 3/2010 | Gupta et al. ............. 370/331 |
| 2010/0091653 | A1 | 4/2010 | Koodli et al. |
| 2010/0190500 | A1* | 7/2010 | Choi et al. ............. 455/436 |
| 2010/0260141 | A1 | 10/2010 | Chowdhury et al. |
| 2011/0080867 | A1* | 4/2011 | Mildh ............. 370/328 |

OTHER PUBLICATIONS

3GPP TS 29.060 V7.11.0 (Sep. 2008); 3rd Generation Partnership Project; Technical Specification Group Core Network and Terminals; General Packet Radio Service (GPRS); GPRS Tunneling Protocol (GTP) across the Gn and Gp interface (Release 7); http://www.3gpp.org, 145 pages.

3GPP TS 29.060 V8.5.0 (Sep. 2008); 3rd Generation Partnership Project; Technical Specification Group Core Network and Terminals; General Packet Radio Service (GPRS); GPRS Tunneling Protocol (GTP) across the Gn and Gp interface (Release 8); http://www.3gpp.org, 146 pages.

3GPP TS 36.300 V8.6.0 (Sep. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); http://www.3gpp.org, 137 pages.

Gundavelli, E. et al., "Proxy Mobile IPv6," RFC 5213, Standard Tracks, Aug. 2008, 93 pages.

Narten, T. et al., "Neighbor Discovery for IP version 6 (IPv6)," RFC 4861, Standard Track, Sep. 2007, 98 pages.

* cited by examiner

INTERWORKING FUNCTION FOR COMMUNICATION NETWORKS

CROSS REFERENCE TO RELATED APPLICATION

This application claims the benefit under 35 U.S.C. §119 (e) of U.S. Provisional Patent Application No. 61/169,153, filed Apr. 14, 2009, which is hereby incorporated by reference herein in its entirety.

FIELD OF THE DISCLOSURE

This disclosure relates to the field of telecommunications, and more particularly, to systems and methods for providing interworking between different interfaces in a communication network.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology. Other wireless protocols have also developed including WiFi, an implementation of various IEEE 802.11 protocols, WiMAX, an implementation of IEEE 802.16, and HiperMAN, which is based on an ETSI alternative to IEEE 802.16.

Wireless communication technologies are used in connection with many applications, including, for example, satellite communications systems, portable digital assistants (PDAs), laptop computers, and mobile nodes (e.g., cellular telephones, user equipment). One benefit that users of such applications can obtain is the ability to connect to a network (e.g., the Internet) as long as the user is within range of such a wireless communication technology.

As network operators upgrade from one generation of technology to another, there may be compatibility issues between old and new technologies. In addition, a mobile user may need to access both the old and new technologies. For example, as part of rolling out LTE, operators are considering various options for offering voice services via already deployed technologies. One option is to deploy circuit switched (CS) fallback as specified in 3GPP TS 23.272. CS fallback in evolved packet system (EPS) can enable voice and other CS-domain services by reuse of CS infrastructure when a mobile node is served by an evolved universal terrestrial radio access network (E-UTRAN). However, to deploy CS fallback, network operators can be required to upgrade legacy MCSs to become fallback capable. Upgrading legacy equipment may not be a desirable investment for many operators.

SUMMARY

Systems and methods for providing an interworking function are disclosed. Network operators may not find it desirable to upgrade legacy equipment to function with new equipment. Instead, they may prefer, e.g., to employ an interworking function in the new equipment which allows the new equipment to function with the legacy equipment. The interworking function, e.g., can convert messages between interfaces of the new equipment and legacy equipment to provide compatibility for mobile users accessing either the new equipment or the legacy equipment.

The interworking function can, e.g., enable a mobile node to switch from a first technology to a second technology, in some embodiments. The switching of technologies can include transitioning from one generation of networking equipment to another generation of networking equipment. For example, a mobile node can switch from communicating via LTE to GSM network equipment and via using packet switched networking equipment to circuit switched networking equipment. The interworking function can also hide newer functionalities and network equipment by acting like an older piece of network equipment in some embodiments.

In some embodiments, methods for providing voice communications in a network that provides the voice communications and data communications are provided, the methods including: receiving an attach message from a mobile node indicating the mobile node can fallback from a first radio access technology to a second radio access technology and including location information identifying a location of the mobile node, the attach message received via the first radio access technology; based on the attach message, generating a location update message including the location information, the location update message conformant with first interface procedures; translating the location update message to be conformant with second interface procedures to form a translated location update message; sending the translated location updated message to a remote switching device; receiving a paging request from the remote switching device, the paging request conformant with the second interface procedures and regarding an incoming voice call directed to the mobile node; translating the paging request to be conformant with the first interface procedures to form a translated paging request; based on the translated paging request and the location information, paging the mobile node regarding the incoming voice call; receiving a page response from the mobile node; and based on the page response and the indication that the mobile node can fallback to the second radio access technology, setting up the voice call with the mobile node via the second radio access technology.

In some embodiments, methods for providing voice communications in a network providing both the voice communications and data communications are provided, the methods including: receiving an attach message from a mobile node indicating the mobile node can fallback from a first radio access technology to a second radio access technology and including location information identifying a location of the mobile node, the attach message received via the first radio access technology; based on the attach message, generating a location update message including the location information, the location update message conformant with first interface procedures; translating the location update message to be conformant with second interface procedures to form a translated location update message; sending the translated location updated message to a remote switching device; receiving a service request message from the mobile node, the service request message requesting initiation of a voice call, the service request message received via the first radio access technology; and based on the service request message and the indication that the mobile node can fallback to the second radio access technology, setting up the voice call with the mobile node via the second radio access technology.

In some embodiments, control nodes in a network that provides data communications via a first radio access technology and voice communications via a second radio access technology are provided, the control nodes configured to: receive an attach message from a mobile node indicating the mobile node can fallback from the first radio access technology to the second radio access technology and including location information identifying a location of the mobile node, the attach message received via the first radio access technology; based on the attach message, generating a location update message including the location information, the location update message conformant with first interface procedures; translate the location update message to be conformant with second interface procedures to form a translated location update message; send the translated location updated message to a remote switching device; receive a paging request from the remote switching device, the paging request conformant with the second interface procedures and regarding an incoming first voice call directed to the mobile node; translate the paging request to be conformant with the first interface procedures to form a translated paging request; based on the translated paging request and the location information, paging the mobile node regarding the incoming first voice call; receive a page response from the mobile node; based on the page response and the indication that the mobile node can fallback to the second radio access technology, set up the first voice call with the mobile node via the second radio access technology; receive a service request message from the mobile node, the service request message requesting initiation of a second voice call, the service request message received via the first radio access technology; and based on the service request message and the indication that the mobile node can fallback to the second radio access technology, setting up the second voice call with the mobile node via the second radio access technology.

DETAILED DESCRIPTION

Systems and methods are disclosed that provide an interworking function in a communications network. The interworking function can be implemented on gateway device, such as in a chassis, in the communications network. The interworking function provides compatibility between different interfaces to allow user equipment (UE), such as a phone, wireless laptop, or other wireless device, to communicate with legacy networking equipment. For example, a network operator may have an older mobile switching center (MSC) which connects to a circuit switched network, but also offer data services on a newer packet switched network. In such an example the UE can access the circuited switched network, such as the public switched telephone network (PSTN), in order to make a voice call. However, the older MSC may not be compatible with later installed network equipment. The interworking function can provide the ability for the later installed network equipment (e.g., a mobility management entity (MME)) to communicate with the legacy equipment (e.g., an MSC) without upgrading the legacy equipment.

The interworking function also allows a mobile node to communicate packet data using a first technology and communicate voice in a second technology. For example, a mobile node can communicate using, e.g., an LTE network to send and receive data, such as emails, and browse the Internet. In addition, the mobile node can be switched to, e.g., a 2G or 3G network and circuit switched technology to make a voice call or receive a voice call. The interworking function enables, e.g., a mobile node to switch from a newer technology to an earlier technology so that the mobile node can place a voice call using the earlier technology.

The need for an interworking function can arise where a network operator is rolling out a partial solution, in which communications are available via multiple technologies. For example, a network operator can offer 4G data, but because of certain limitations voice calls can be handled using a circuit switched network instead of the 4G network. These limitations can occur because of limitations in the UE, the radio access network (RAN), or the core network. For example, if there is not enough packet switched bandwidth to provide VoIP the network may have the UE fall back to circuit switched telephony for the voice call. Another instance of when this can occur is when the LTE RAN (the evolved universal terrestrial radio access network (EUTRAN)) cannot support any further sessions. In such a case, the UE can fallback to the UTRAN (universal terrestrial radio access network) where there is bandwidth to take the call using the MSC. The interworking function can allow the switching of technologies in the network, such as switching from the EUTRAN to the UTRAN. By masking the interface towards the mobile node, the interworking function can provide the communications in an interface suitable for the MSC.

Figure 1:
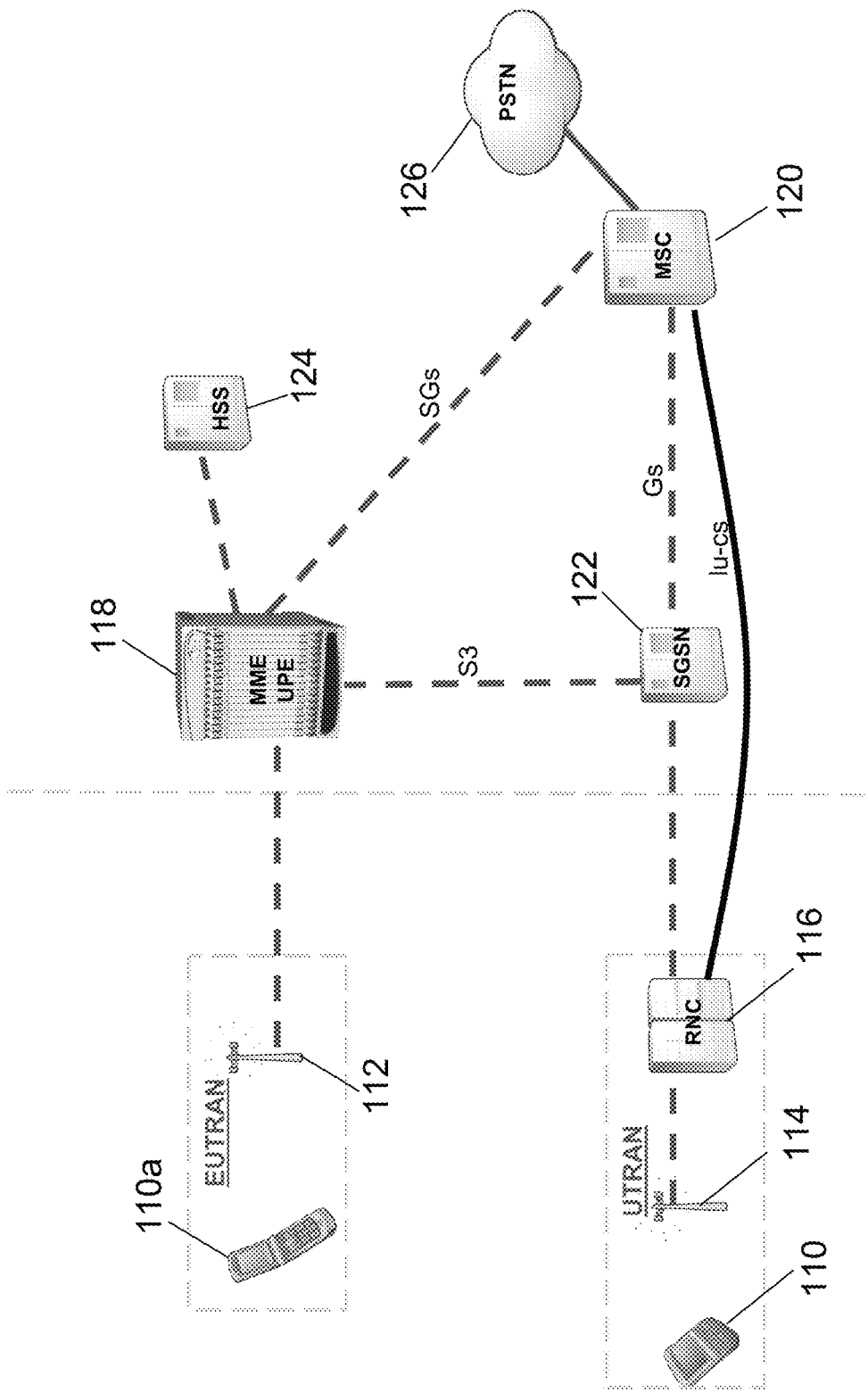
FIG. 1 illustrates a network diagram in accordance with certain embodiments.

FIG. 1 illustrates an interworking function in a long term evolution (LTE) network. FIG. 1 illustrates both a universal mobile telecommunication system (UMTS) release 8 network and a LTE network. The network diagram of FIG. 1 includes user equipment (UE) 110 and 110a, an evolved nodeB (eNB) 112, a nodeB 114, a radio network controller (RNC) 116, a mobility management entity (MME)/user plane entity (UPE) 118, a mobile switching center (MSC) 120, a Serving General packet radio service Support Node (SGSN) 122, a home subscriber server (HSS) 124, and a public switched telephone network (PSTN) 126. An interworking function can reside in a chassis, which may also include one or more other functionalities such as a MME, UPE, and SGSN. As shown, the MSC 120 may need to communicate via a variety of interfaces, such as, SGs, Gs, and Iu-cs depending on, e.g., which devices it is communicating with and for what purposes the communications are being made. MSC 120 may not be able to communicate via newer interfaces if the MSC was not designed to handle communications from, e.g., newer network devices, such as, e.g., an MME or UPE 118. The MSC 120 could be upgraded to handle a variety of interfaces, but a network operator may not want to invest in this upgrade.

The interworking function can translate commands and messaging from a first interface to a second interface. For example, the interworking function can translate SGs to Gs to Gs to SGs so that, e.g., a legacy MSC which only communicates in Gs, can function with a MME that, without the interworking function, would only communicate in SGs. In some embodiments, the second interface is an interface that is compatible with MSC 120. In typical circuit-switched wireless communication systems, the MSC 120 connects the landline public switched telephone network (PSTN) 126 system to the wireless communication system. The MSC 120 can be responsible for handling voice calls and short message service (SMS) as well as other services (such as conference calls, facsimiles, and circuit switched data). The MSC sets up and releases the end-to-end circuit switched connection, handles mobility and hand-over requirements during the call, and takes care of charging and real time pre-paid account monitoring. Network operators may have MSCs that have varying levels of compatibility with 2G and 3G networks, as the MSCs may have been initially deployed for 1G networks. The interworking function can allow the network operator to continue using the same MSCs as the compatibility is provided through the interworking function.

The MME 118 is a control-node for the LTE access network. The MME 118 is responsible for UE tracking and paging procedures and may also handle retransmissions. MME 118 handles the bearer activation/deactivation process and is also responsible for choosing a serving gateway (SGW) for a UE 110 at the initial attach and at time of an intra-LTE handover. The MME 118 also authenticates the user by interacting with the HSS 124, generates and allocates temporary identities to UEs, terminates Non-Access Stratum (NAS) signaling, checks the authorization of the UE 110 to camp on the service provider's Public Land Mobile Network (PLMN), and enforces UE roaming restrictions. The MME 118 is the termination point in the network for ciphering/integrity protection for NAS signaling and handles the security key management. Lawful interception of signaling is also supported by the MME 118. The MME provides the control plane function for mobility between LTE and 2G/3G access networks with the S3 interface terminating at the MME 118 from the SGSN 122. The MME 118 terminates the S6a interface towards the home HSS for roaming UEs. The MME 118 and SGSN 122 can be implemented in a chassis as described below.

SGSN 122 is responsible for the delivery of data packets from and to the mobile stations within its geographical service area. The SGSN 122 can provide packet routing and transfer, mobility management (attach/detach and location management), logical link management, and authentication and charging functions. The location register of the SGSN stores location information (e.g., current cell, current VLR) and user profiles (e.g., IMSI, address(es) used in the packet data network) of GPRS users registered with SGSN 122. In some embodiments, MSC 120 is capable of communicating with SGSN 122 via an SS7 interface (e.g., Gs), but is not capable of communicating with the MME 118 in a packet interface (e.g., SGs).

Figure 2:
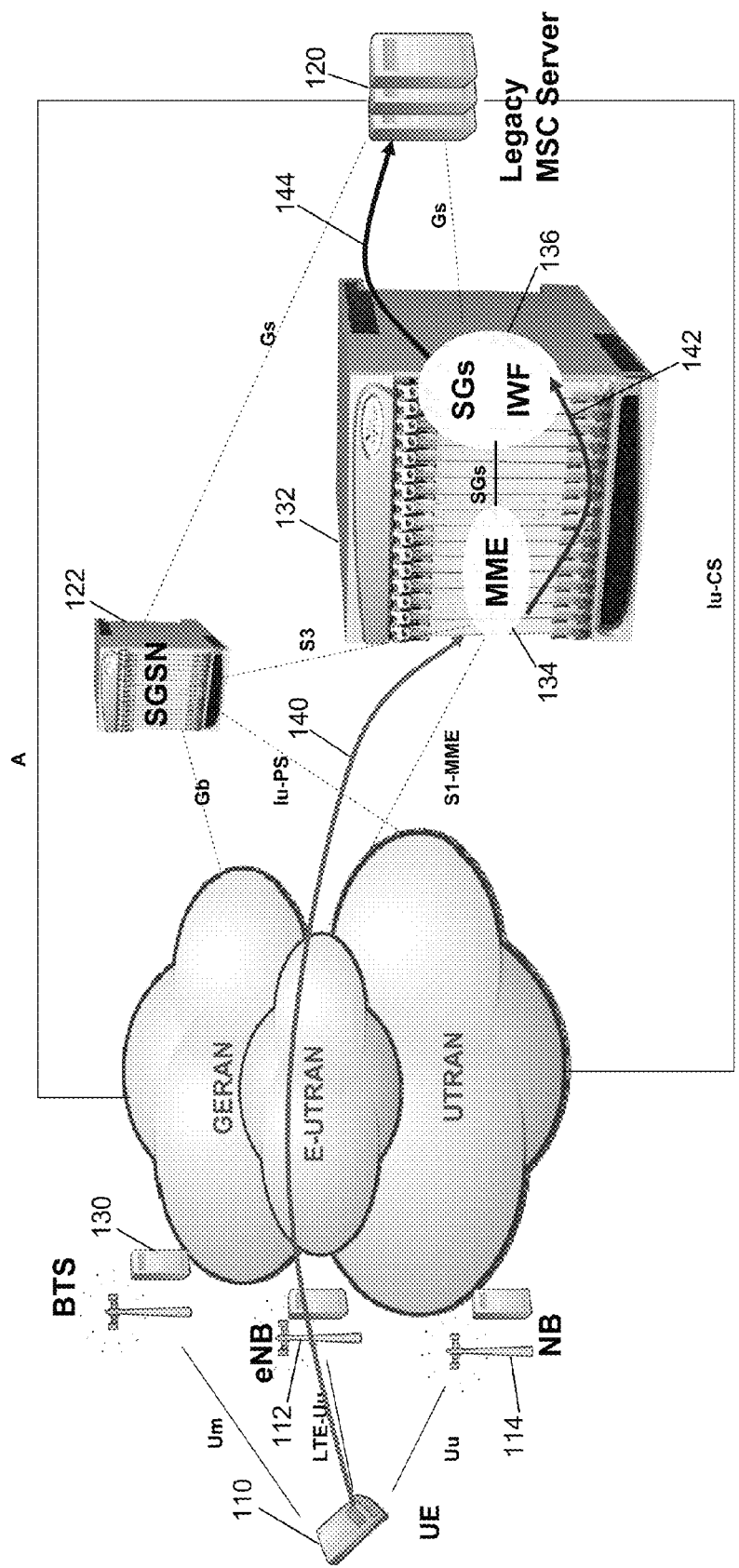
FIG. 2 illustrates a network diagram with messaging to perform an initial attach in accordance with certain embodiments.

FIG. 2 illustrates an interworking function in a chassis in accordance with certain embodiments. FIG. 2 includes user equipment 110, eNB 112, NodeB (NB) 114, MSC 120, SGSN 122, base transceiver station (BTS) 130, chassis 132, MME 134, and interworking function (IWF) 136. The interworking function 136 can be a logical function that is implemented in software. The software can be stored in a computer readable storage medium such as random access memory, flash memory, disk memory, transistor based memory, or any other storage device. The software can be processed by a processing unit, such as one or more microprocessors or application-specific processing circuits. The software implementation of the interworking function can be a database that stores session information associated with a session such as, e.g., the current cell, the current VLR, user profiles (e.g., IMSI, address(es) used in the packet data network, etc. The session is used to track and process a call or data flow for a particular UE. For example, when a UE attaches to a network to send and receive data with the network, a session is created to store information to service the UE. The session information (which can be updated as, e.g., the mobile node moves from one NB to another) can be used to determine how messages are translated from a first interface to a second interface. For example, the session information can be used to indicate that messages need to be translated from SGs to Gs. The database allows the interworking function to track what has already happened so the proper commands can be issued from the interworking function. The interworking function can include a number of rules or conditions which determine how commands are translated. For example, it can include rules and conditions for translating an SGs communication to a Gs communication, including, e.g., sending the translated message using the proper protocol. For example, when a message is received at the interworking function, the interworking function can check conditions in the database and by knowing the received message and the state of the session, the interworking function can compose a message to send. The message can be sent to the MME, the UPE, or the MSC for example.

The interworking function can abstract a function or device. This abstraction can hide the actual function or incompatible device which is incompatible from a corresponding device. For example, a legacy MSC cannot communicate directly with a MME since the MSC and MME use different interfaces. The interworking function can hide the MME from the legacy MSC, and the MSC acts as if it were communicating with a SGSN. For example, the MSC communicates in Gs as if it were communicating with a SGSN and does not realize that the MSC is in fact communicating with a MME through an interworking function, which is translating the Gs messages to SGs messages to send to the MME function. In the other direction, the SGs messages can be translated to Gs messages and sent to the MSC. The interworking function can provide abstraction for other network devices in the network to avoid any incompatibility issues. For example, with MSCs, network operators may not want to upgrade the MSCs to be compliant with LTE standards which require communication in SGs interface. Upgrading the MSCs may be costly or time consuming, and network operators may not find the upgrade worthwhile or economical.

FIG. 2 also illustrates an attach procedure for a UE device. The attach procedure is used to allow a UE to associate with the network to send and receive calls. The UE 110 can begin an attach procedure by sending an evolved packet system (EPS) attach message 140 to MME 134. The attach message can be a combination attach which provides information regarding UE 110 and whether UE 110 is circuit switched fallback capable. The attach message 140 can provide information about the circuit switched identity such as an international mobile subscriber identity (IMSI), a MME address, a location update type, and/or a location area identity (LAI). This identity information (e.g., IMSI) can be used to acquire other details of the mobile in the Home Location Register (HLR) or a local copy of the information in the Visitor Location Register (VLR). The IMSI can be used in any network that interconnects with other networks, such as CDMA, EVDO, and GSM networks. The IMSI can be used to register the UE with the MSC and can provide location information to the MSC 120. In 142, a location update is sent from the MME 134 to the interworking function 136. The location update can be a SGs message which the interworking function 132 converts to a Gs location update message 144. The Gs location update message 144 informs the MSC 120 as to the location of the UE 110. The interworking function can convert a message in a first interface into a message in a second interface.

Figure 3:
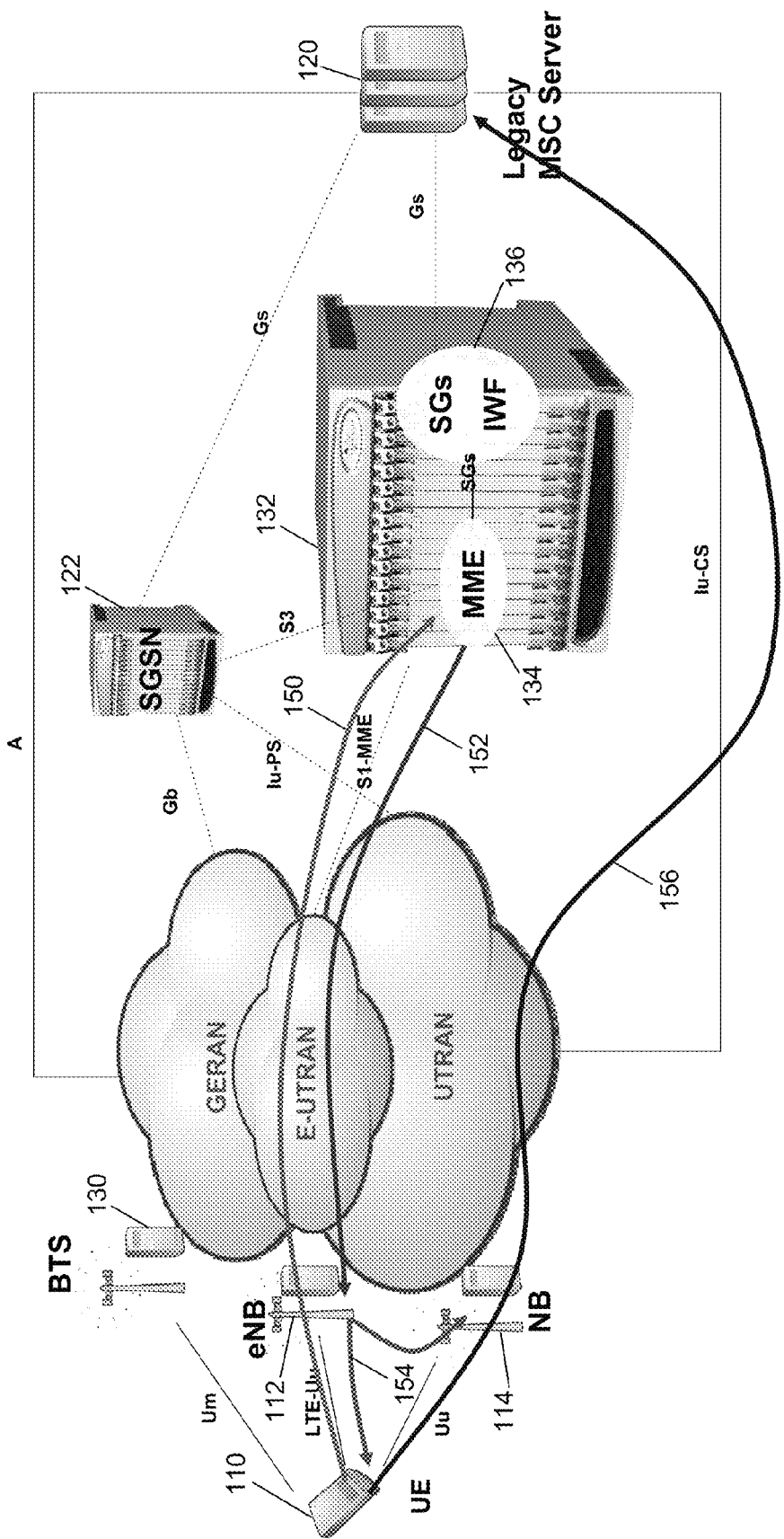
FIGS. 3 and 4 illustrate a network diagram with messaging to perform call setup in accordance with certain embodiments.

FIG. 3 illustrates a mobile originated circuit switched call in accordance with certain embodiments. FIG. 3 includes user equipment 110, eNB 112, NodeB (NB) 114, MSC 120, SGSN 122, base transceiver station (BTS) 130, chassis 132, MME 134, and interworking function (IWF) 136. The UE 110 sends a service request message 150 to MME 134 to initiate a voice call. The UE 110 can include a domain indicator to indicate that a circuit switched (CS) or packet switched (PS) call is to occur. The chassis 132 or MME 134 can determine from the initial attach or domain indicator whether CS or PS technology is employed to make the voice call. For example, the domain indictor can indicate whether the call is to be circuit switched or packet switched. In some networks, an indication that the communication is to be circuit switched indicates that the communication is a voice call, and an indication that the communication is packet switched indicates the communication is a data communication. For example, the MME 134 can determine to relocate the call to the UTRAN. The MME sends a message 152 to initiate a switch from 4G radio (EUTRAN) to the 3G radio (UTRAN). The MME can send a message 152 to initiate a switch to 2G radio (GSM EDGE Radio Access Network (GERAN)) through BTS 130. The switching of RAN technologies can be from any technology to another technology. In messaging 154, the RANs communicate to initiate the switch from eNB 112 to NB 114. In 156, when the setup is complete a voice call can be setup from the UE 110 to the MSC 120.

Figure 4:
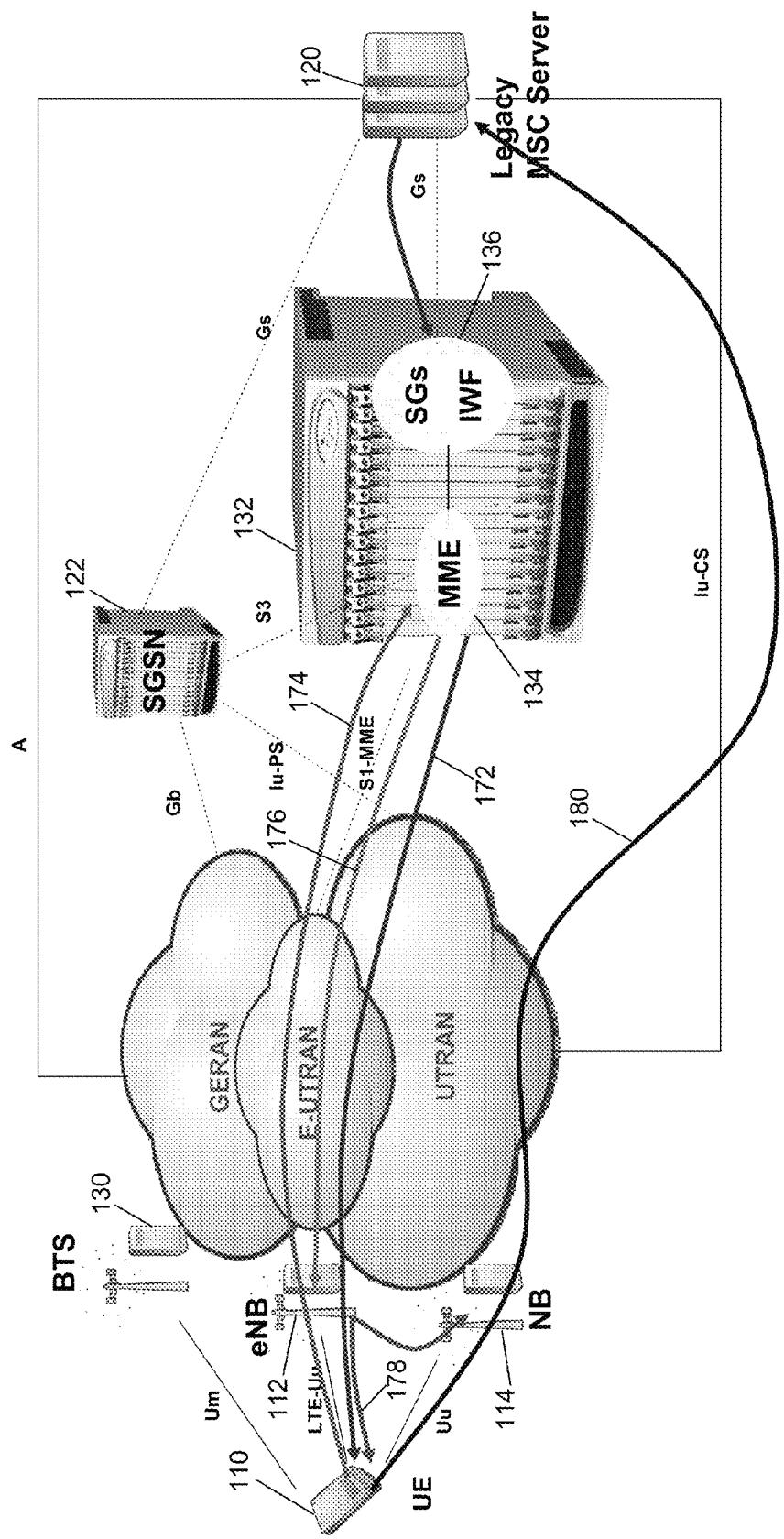

FIG. 4 illustrates a network originated call for the UE in accordance with certain embodiments. FIG. 4 includes user equipment 110, eNB 112, NodeB (NB) 114, MSC 120, SGSN 122, base transceiver station (BTS) 130, chassis 132, MME 134, and interworking function (IWF) 136. The call that originates from the network is received at MSC 120. The MSC 120 uses the initial attach information to locate UE 110 in order to alert UE 110 of the incoming call. MSC 120 sends a paging request message 170 to chassis 132 which includes the interworking function 136. The MSC may not be aware that the paging request is being sent to a interworking function. The paging request 170 can be sent in the Gs interface in some embodiments. The interworking function 136 can covert the paging request and pass the paging request to MME 134. MME 134 sends a page request 172 to UE 110 to alert the UE of an incoming call. The UE 110 sends a page response 174 to the MME 134. The chassis 132 or MME 134 can determine from the initial attach information if the UE is to switch technologies in order to setup the voice call. The MME sends message 176 to initiate a switch from eNB 112 to NB 114 and from the EUTRAN to the UTRAN. In messaging 178, the RANs communicate to initiate the switch from eNB 112 to NB 114. In 180, when the setup is complete a voice call can be setup from the UE 110 to the MSC 120 and bearer traffic can flow from the UE 110 to MSC 120.

Figure 5:
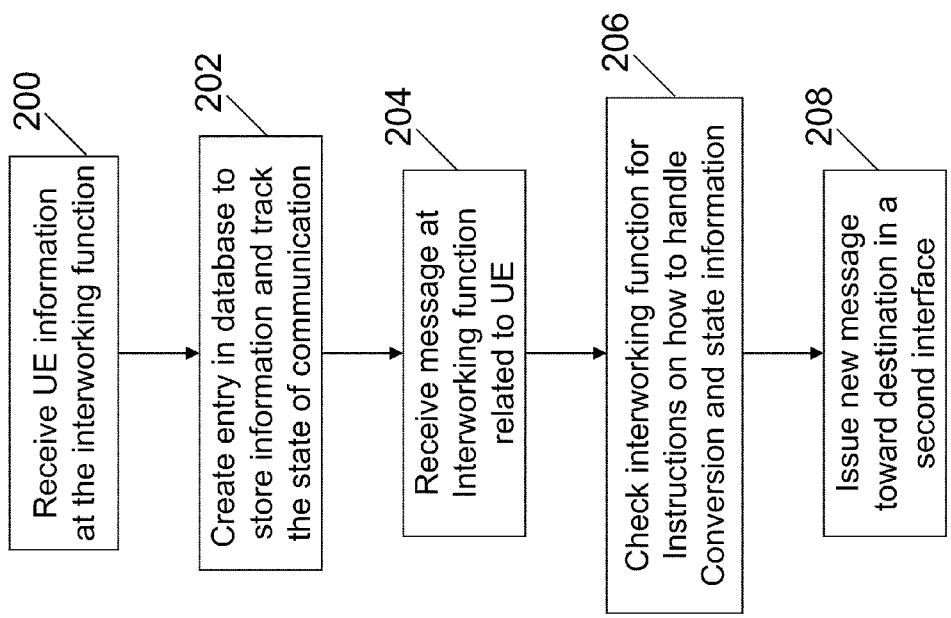
FIG. 5 illustrates a flow diagram in accordance with certain embodiments.

FIG. 5 illustrates a flow diagram of interworking function operation in accordance with certain embodiments. As mentioned above, the interworking function can be implemented in software in a chassis or other network device. The interworking function can receive information regarding the user equipment (UE) in step 200. The information received can be IMSI, IP address, location information, UE capabilities (e.g., circuit switched fallback capabilities), and any other applicable information. The information in step 200 can be received as part of an initial attach procedure that can occur when a UE is powered up. In step 202, an entry is created in a database of the interworking function to store information received from the UE and may be received from other network devices. The other network devices can include an authentication, authorization, and accounting (AAA) server, a visitor location register (VLR), a home subscriber server (HSS), a RADIUS server, a DIAMETER server, a policy and charging rules function (PCRF), for example.

The database of the interworking function can also be a shared database, where the database is used by one or more hardware and software functions. For example, the interworking function database can be included in the same database that is used to track sessions or UE information for the purposes of processing and routing packets. The database of the interworking function can also store state information relating to what has been sent and received by the interworking function for a particular UE or session of a UE. This state information can be used to determine how incoming messages or instructions are converted to another format or interface.

In step 204, a message is received at the interworking function related to the UE. The interworking function can check instructions or rules on how to handle conversion of the message based on the current state information in the database in step 206. In step 208, the interworking function can then determine how to form the new message in a second interface that is compatible with the network device to which the message is headed.

The chassis described above can implement multiple and different integrated functionalities. In some embodiments, a mobility management entity (MME), a serving gateway (SGW), a PDN gateway (P-GW), an access gateway, a packet data serving node (PDSN), a foreign agent (FA), or home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF), a serving gateway (SGW), and a packet data network gateway (PDN GW). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

Figure 6:
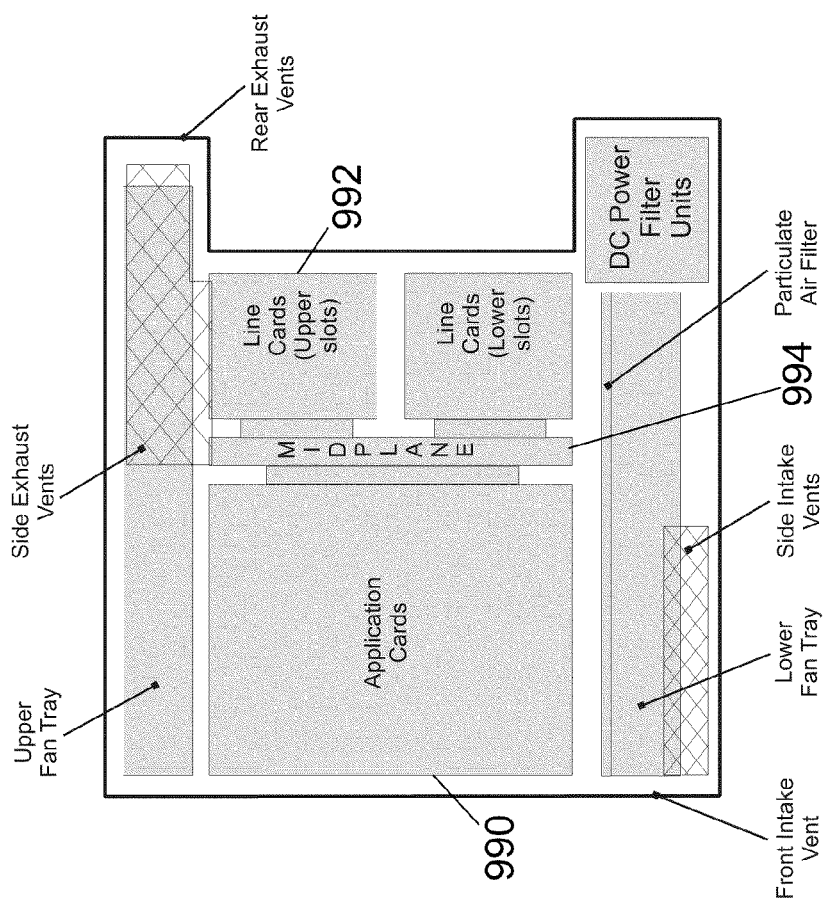
FIG. 6 illustrates a chassis in accordance with certain embodiments.

The features of a chassis that implements a gateway, in accordance with some embodiments, are further described below. FIG. 6 illustrates positioning of cards in the chassis in accordance with some embodiments. The chassis includes slots for loading application cards 990 and line cards 992. A midplane 994 can be used in the chassis to provide intrachassis communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides multi-threaded point-to-point, packet data processing, and context processing capabilities, among other things.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDN GW, SGW, PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed is:

1. A method comprising:
   receiving at a control node in a network an attach message from a mobile node for attaching the mobile node to the network to enable the mobile node to send and receive calls, wherein the attach message indicates whether the mobile node can fallback from a first radio access technology to a second radio access technology and includes location information identifying a location of the mobile node and wherein the attach message is received via the first radio access technology;
   based on the attach message, generating at the control node a location update message including the location information, the location update message conformant with first interface procedures;
   translating the location update message to be conformant with second interface procedures to form a translated location update message using an interworking function;
   sending the translated location updated message to a remote switching device;
   receiving at the control node from the mobile node via the first radio access technology a service request message requesting for an outgoing voice call via the second radio access technology;
   based on the service request message and the indication that the mobile node can fallback from the first radio access technology to the second radio access technology, setting up at the control node a voice call between the mobile node and the remote switching device for the outgoing voice call via the second radio access technology;
   receiving at the control node a paging request from the remote switching device, the paging request conformant with the second interface procedures and regarding an incoming voice call directed to the mobile node;
   translating the paging request to be conformant with the first interface procedures to form a translated paging request using the interworking function;
   based on the translated paging request and the location information, paging the mobile node from the control node regarding the incoming voice call;
   receiving, at the control node a page response from the mobile node; and
   based on the page response and the indication that the mobile node can fallback to the second radio access technology, setting up a voice call between the mobile node and the remote switching device for the incoming voice call via the second radio access technology.

2. The method of claim 1, wherein the first radio access technology (RAT) includes 4G RAT and the second radio access technology comprises one of 3G RAT and 2G RAT.

3. The method of claim 1, wherein the first interface procedures include SGs and the second interface procedures include Gs.

4. The method of claim 1, wherein the remote switching device includes a mobile switching center.

5. The method of claim 1, further comprising instructing at least one radio access network to initiate a switch of the mobile node from an evolved nodeB to a nodeB.

6. The method of claim 1, further comprising:
   receiving at the control node a service request message from the mobile node via the first radio access technology, the service request message requesting for a data communication via the first radio access technology; and
   setting up at the control node the requested data communication between the mobile node and a communication node in the network via the first radio access technology.

7. The method of claim 1, wherein the control node in the network includes a mobility management entity (MME).

8. The method of claim 1, wherein the interworking function includes an interworking function database containing rules on how a message or a request may be translated.

9. A control node in a network, the control node configured to:
   receive an attach message from a mobile node for attaching the mobile node to the network to enable the mobile node to send and receive calls, wherein the attach message indicates whether the mobile node can fallback from a first radio access technology to a second radio access technology and includes location information identifying a location of the mobile node and wherein the attach message is received via the first radio access technology;
   based on the attach message, generate a location update message including the location information, the location update message conformant with first interface procedures;
   translate the location update message to be conformant with second interface procedures to form a translated location update message using an interworking function;
   send the translated location updated message to a remote switching device;
   receive a paging request from the remote switching device, the paging request conformant with the second interface procedures and regarding an incoming first voice call directed to the mobile node;
   translate the paging request to be conformant with the first interface procedures to form a translated paging request using the interworking function;
   based on the translated paging request and the location information, page the mobile node regarding the incoming first voice call;
   receive a page response from the mobile node;

based on the page response and the indication that the mobile node can fallback from the first radio access technology to the second radio access technology, set up a voice call between the mobile node and the remote switching device for the incoming first voice call via the second radio access technology;

receive a service request message from the mobile node via the first radio access technology, the service request message requesting for an outgoing second voice call via the second radio access technology; and based on the service request message and the indication that the mobile node can fallback from the first radio access technology to the second radio access technology, set up a voice call between the mobile node and the remote switching device for the outgoing second voice call via the second radio access technology.

10. The control node of claim 9, wherein the first radio access technology (RAT) includes 4G RAT and the second radio access technology comprises one of 3G RAT and 2G RAT.

11. The control node of claim 9, wherein the first interface procedures include SGs and the second interface procedures comprise Gs.

12. The control node of claim 9, wherein the remote switching device includes a mobile switching center.

13. The control node of claim 9, further comprising instructing at least one radio access network to initiate a switch of the mobile node from an evolved nodeB to a nodeB.

14. The control node of claim 9, further configured to:

receive a service request message from the mobile node via the first radio access technology, the service request message requesting for a data communication via the first radio access technology;

and set up the requested data communication between the mobile node and a communication node in the network via the first radio access technology.

15. The control node of claim 14, further configured to route at least a portion of the data communication to a serving general packet radio service support node.

16. The control node of claim 9, wherein the control node comprises a mobility management entity.

17. The control node of claim 9, wherein the interworking function includes an interworking function database containing rules on how a message or a request may be translated.

* * * * *